United States Patent
Andersson et al.

(10) Patent No.: US 8,911,011 B2
(45) Date of Patent: Dec. 16, 2014

(54) ARMREST ASSEMBLY HAVING BEVERAGE HOLDER

(75) Inventors: Christer Andersson, Trollhattan (SE); Odd Jaegtnes, Nygard (SE)

(73) Assignee: Lear Corporation, Southfield, MI (US)

( * ) Notice: Subject to any disclaimer, the term of this patent is extended or adjusted under 35 U.S.C. 154(b) by 103 days.

(21) Appl. No.: 13/580,495

(22) PCT Filed: Mar. 3, 2011

(86) PCT No.: PCT/US2011/027022
§ 371 (c)(1),
(2), (4) Date: Aug. 22, 2012

(87) PCT Pub. No.: WO2011/109615
PCT Pub. Date: Sep. 9, 2011

(65) Prior Publication Data
US 2012/0319440 A1 Dec. 20, 2012

Related U.S. Application Data

(60) Provisional application No. 61/309,915, filed on Mar. 3, 2010.

(51) Int. Cl.
*A47C 7/62* (2006.01)
*B60N 2/46* (2006.01)
*B60N 3/10* (2006.01)

(52) U.S. Cl.
CPC .............. *B60N 2/468* (2013.01); *B60N 2/4613* (2013.01); *B60N 3/102* (2013.01)
USPC ............ 297/188.14; 297/188.17; 297/188.15; 297/227

(58) Field of Classification Search
CPC ..... B60N 2/4613; B60N 2/468; B60N 2/4686
USPC .............. 297/188.16, 188.17, 411.32, 411.2, 297/411.21, 411.3, 188.15, 284.11, 188.14, 297/188.18; 224/926, 281; 248/311.2; 312/330.1, 334.1, 334.5
See application file for complete search history.

(56) References Cited

U.S. PATENT DOCUMENTS 4,417,764 A * 11/1983 Marcus et al. ........... 297/188.17
5,060,899 A * 10/1991 Lorence et al. ............ 248/311.2
(Continued)

FOREIGN PATENT DOCUMENTS

DE 4200823 A1 7/1993
DE 4306935 C1 7/1994
(Continued)

OTHER PUBLICATIONS

German Search Report, Application No. 102011083457.5, dated Oct. 16, 2012.
(Continued)

*Primary Examiner* — Chi Q Nguyen
(74) *Attorney, Agent, or Firm* — MacMillan, Sobanski & Todd, LLC (57) ABSTRACT

An armrest assembly includes a body and a pair of elongate side members at an outer side periphery of the body. The assembly further includes a tray extending between the side members, wherein the tray defines a beverage holder and is slidably mounted relative to the body.

17 Claims, 9 Drawing Sheets

(56) References Cited

U.S. PATENT DOCUMENTS

| | | | |
|---|---|---|---|
| 5,131,716 A * | 7/1992 | Kwasnik et al. | 297/188.16 |
| 5,171,061 A | 12/1992 | Marcusen | |
| 5,195,711 A * | 3/1993 | Miller et al. | 248/311.2 |
| 5,246,269 A * | 9/1993 | DeBoer et al. | 297/227 |
| 5,248,183 A * | 9/1993 | Gignac et al. | 297/188.16 |
| 5,267,761 A | 12/1993 | Curtindale et al. | |
| 5,284,314 A | 2/1994 | Misaras et al. | |
| 5,330,146 A * | 7/1994 | Spykerman | 248/311.2 |
| 5,372,403 A * | 12/1994 | Puerto | 297/188.17 |
| 5,375,805 A * | 12/1994 | Sudak et al. | 248/311.2 |
| 5,505,516 A | 4/1996 | Spykerman et al. | |
| 5,524,958 A | 6/1996 | Wieczorek et al. | |
| 5,634,621 A | 6/1997 | Jankovic | |
| 5,639,002 A | 6/1997 | Weitbrecht et al. | |
| 5,791,616 A * | 8/1998 | Volkmann et al. | 248/311.2 |
| 5,876,007 A * | 3/1999 | Lancaster et al. | 248/311.2 |
| 6,019,334 A | 2/2000 | Shinomiya | |
| 6,409,136 B1 | 6/2002 | Weiss et al. | |
| 6,439,525 B1 | 8/2002 | Gehring et al. | |
| 6,644,526 B2 | 11/2003 | Pegorier | |
| 6,692,053 B1 | 2/2004 | Smith | |
| 6,708,938 B2 | 3/2004 | Bong | |
| 6,764,053 B1 | 7/2004 | Han | |
| 6,776,381 B1 | 8/2004 | Gisch | |
| 6,969,035 B2 | 11/2005 | Leopold et al. | |
| 6,997,509 B2 | 2/2006 | Kain | |
| 7,025,316 B2 | 4/2006 | Schaal | |
| 7,104,580 B2 | 9/2006 | Clark et al. | |
| 7,104,609 B2 * | 9/2006 | Kim | 297/411.35 |
| 7,131,690 B2 | 11/2006 | Bollaender et al. | |
| 7,225,957 B2 | 6/2007 | Kogami | |
| 7,278,681 B2 * | 10/2007 | Lilov et al. | 297/188.17 |
| 7,568,601 B2 * | 8/2009 | Kogami et al. | 224/483 |
| 7,578,406 B2 | 8/2009 | Katagiri | |
| 2005/0000991 A1 | 1/2005 | Kogami | |
| 2007/0013202 A1 | 1/2007 | Tompson | |
| 2009/0095764 A1 | 4/2009 | Schaal | |

FOREIGN PATENT DOCUMENTS

| | | |
|---|---|---|
| DE | 9306415 U1 | 9/1994 |
| DE | 4415732 A1 | 11/1995 |
| DE | 29810872 U1 | 8/1998 |
| DE | 10149616 A1 | 4/2003 |
| DE | 10215152 A1 | 10/2003 |
| DE | 202005003638 U1 | 5/2005 |
| DE | 202005003650 U1 | 5/2005 |
| DE | 102006003320 A1 | 8/2007 |
| DE | 102008033326 A1 | 12/2009 |
| EP | 1176050 A2 | 1/2002 |
| EP | 1655169 A2 | 5/2006 |
| EP | 2172134 A1 | 4/2010 |
| JP | 6191339 A | 7/1994 |
| JP | 6336136 A | 12/1994 |
| JP | 08010099 | 1/1996 |
| JP | 2003245162 A | 9/2003 |
| JP | 2007290458 A | 11/2007 |
| JP | 2010083423 A | 4/2010 |
| KR | 100559704 B1 | 3/2006 |

OTHER PUBLICATIONS

International Search Report, Application No. PCT/US2011/027022 dated Nov. 15, 2011.

German Office Action, Application No. 112011100763.9, dated Feb. 18, 2014.

Chinese First Office Action, Application No. CN 201180011580.9, dated Jul. 18, 2014.

* cited by examiner

ARMREST ASSEMBLY HAVING BEVERAGE HOLDER

CROSS-REFERENCE TO RELATED APPLICATIONS

This application claims the benefit of U.S. Provisional Application No. 61/309,915, filed Mar. 3, 2010, the disclosure of which is incorporated herein by reference.

BACKGROUND OF THE INVENTION

This invention relates in general to vehicle interior components and in particular to armrests having beverage containers mounted therein. It is becoming common for various components of a vehicle interior to include cupholders or beverage holders for securing various items, such as a beverage container. It is known to integrate beverage holders into portions of vehicle seats. For example, a beverage holder may be incorporated into an armrest assembly of a rear bench style seat, wherein the armrest assembly is movable between a raised and a lowered position. Such conventional beverage holders utilize a plastic base which is mounted or insert molded into the foam portion of the armrest.

SUMMARY OF THE INVENTION

This invention relates to armrests and, in particular to an armrest assembly including a body and a pair of elongate side members at an outer side periphery of the body. The assembly further includes a tray extending between the side members, wherein the tray defines a beverage holder and is slidably mounted relative to the body.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
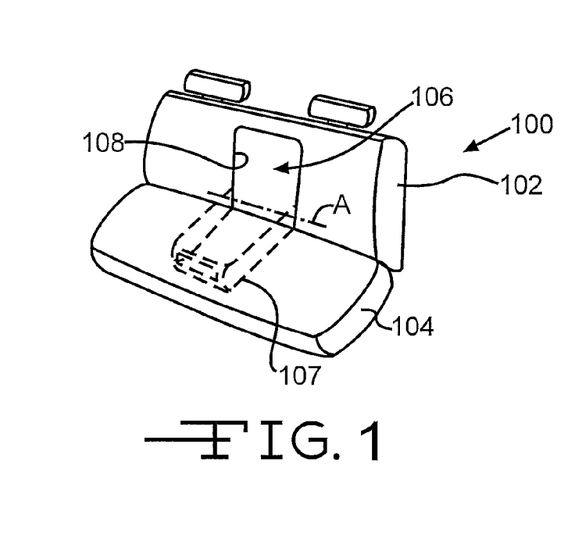
FIG. 1 is a schematic perspective view of a bench style seat having an armrest mounted therein.

Referring now to the drawings, there is illustrated in FIG. 1 vehicle seat assembly 100. The seat assembly 100 may be in the form of bench style seat such as for use as a rear seat of a sedan type vehicle. The seat assembly 100 includes a seat back 102 and a seat bottom 104. The seat back 102 may be fixed relative to the seat bottom 104 or may be pivotally mounted with respect to the seat bottom 104. The seat assembly 100 further includes an armrest assembly 106. The armrest assembly 106 is movable between a storage or upright position located within a recess 108 of the seat assembly 100 as shown in solid lines in FIG. 1. The armrest assembly is pivotally mounted relative to the seat back 102 such that the armrest pivots about an axis A, and can be moved to a lowered or use position as indicated by the phantom lines 107. The armrest assembly 106 may be mounted in the recess such that an underside surface of the armrest assembly 106 defines a seating surface (against an occupant's back) for the seat back 102 of the seat assembly 100. When in the lowered or use position, the armrest assembly may be used as an armrest for passengers sitting on either side of the armrest assembly 106. The armrest assembly 106 may include a framework (not shown) such as at the perimeter of the armrest assembly 106 to provide support and rigidity to the armrest assembly 106. Portions of the armrest assembly 106 may be covered with padding and/or upholstery cover material.

Figure 2:
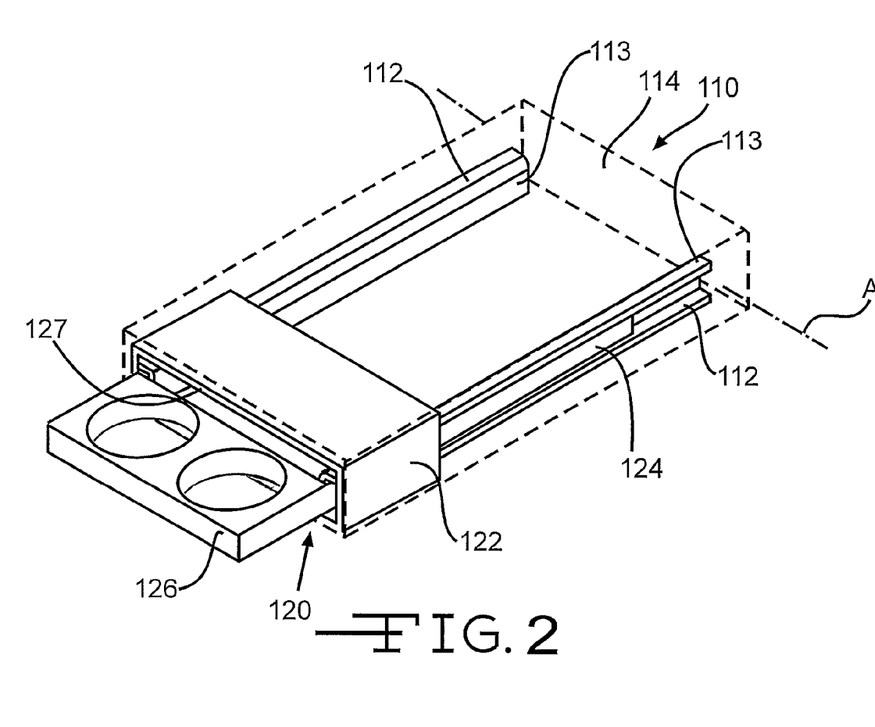
FIG. 2 is a schematic perspective view of a first embodiment of an armrest assembly, wherein the cupholder assembly is shown in its extended use position.

There is illustrated in FIG. 2 a schematic partially sectioned illustration of a first embodiment of an armrest assembly, indicated generally at 110. The armrest 110 may be similar to the armrest assembly 100 and may be used in such a seating arrangement. Thus, the armrest assembly 110 may be pivotally mounted in a recess of a vehicle seat (not shown) about a horizontally extending axis A. The armrest assembly 110 defines a rectangular shaped body and includes a pair of side frame members 112 that provide support and structural rigidity to the body of the armrest assembly 110. The armrest assembly 110 may further include a cross bar (not shown) attaching rear ends 113 of the side frame members 112. A foam padding 114 (shown partially transparent in FIG. 2) and upholstery cover material may cover portions of the armrest assembly 110.

The armrest assembly 110 further includes a beverage or cupholder assembly, indicated generally at 120. The cupholder assembly has a housing 122 attached to the side frame members 112. The side frame members 112 also function as slides to receive extension guides 124 (only one is illustrated) slidably mounted thereon. The side frame members 112 may have a C-shaped cross-section for suitably receiving the extension guides 124. A retractable cupholder tray 126 is attached to the extension guides 124 and is movable between an extended use position, as shown in FIG. 2, and a stowed or storage position within the housing 122. The cupholder tray 126 may be simply manually retracted within a recess 127 of the housing 122 when moved to its retracted storage position.

By using the side frame members 112 as slide members for the retractable cupholder tray 126, the sliding mechanism is moved to the outer edges of the armrest assembly 110 which may suitably provide for a large storage compartment (not shown) between the side frame members 112 and between the rear of the housing 122 and the rear edge of the armrest assembly 110. Also, the entire top surface of the armrest assembly 110 can be used as an armrest.

Figure 3:
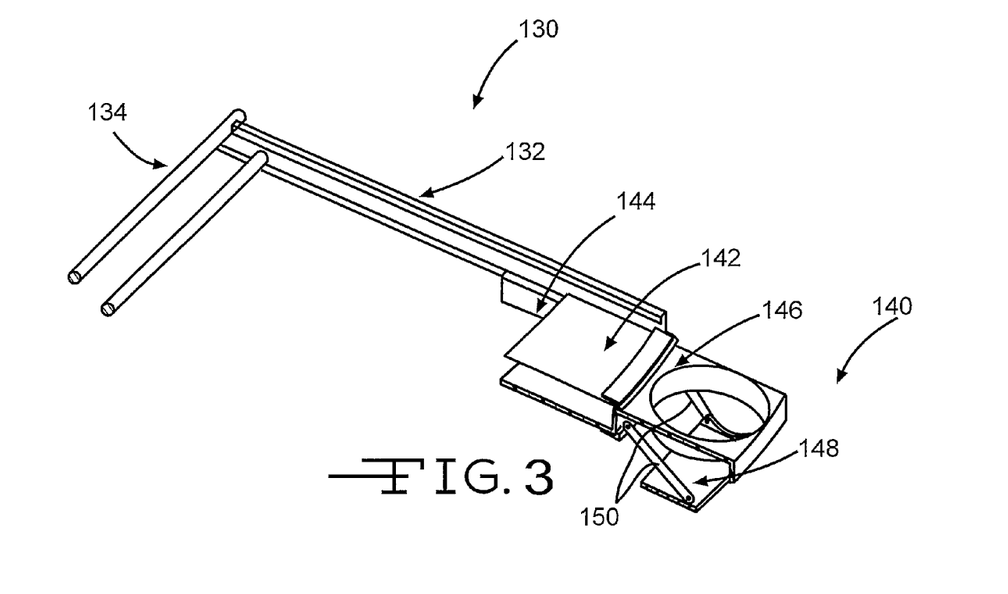
FIG. 3 is a schematic perspective view of a portion of a second embodiment of an armrest assembly shown partially in section, wherein the cupholder assembly is shown in its extended use position.
Figure 4:
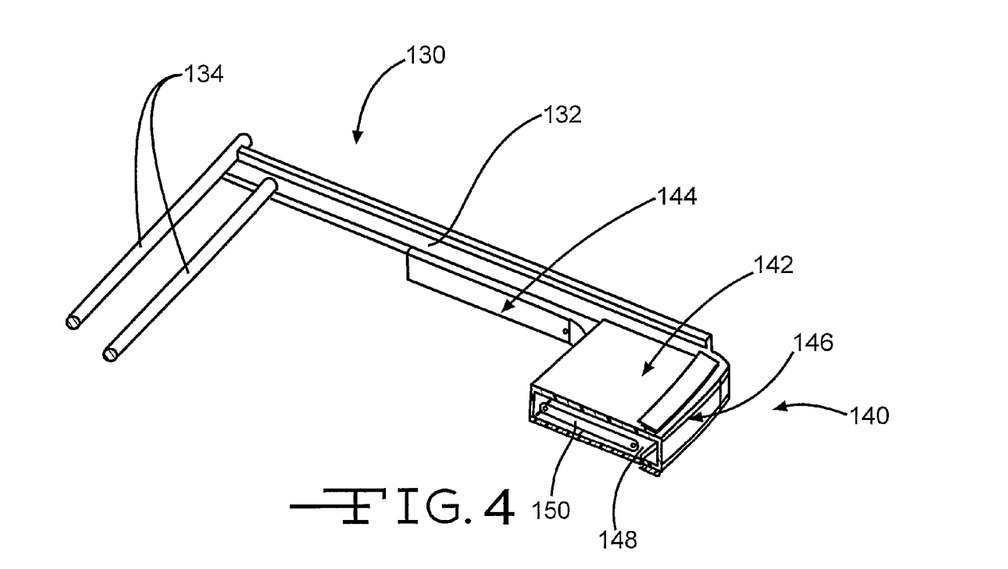
FIG. 4 is a schematic perspective view of the armrest assembly of FIG. 3, wherein the cupholder assembly is shown in its retracted storage position.

There is illustrated in FIGS. 3 and 4 a portion of a second embodiment of an armrest assembly, indicated generally at 130. Note that FIGS. 3 and 4 illustrate a sectioned armrest assembly 130 such that generally only one side of the assembly 130 is shown in FIGS. 3 and 4. The components of the armrest assembly 130 can be used with the armrest assembly 110. The armrest assembly 130 includes a pair of side frame members 132. A pair of cross bars 134 extends along the rear portion of the armrest assembly 130. One of the cross bars 134 may define the pivot axis, while the other may slide in an arcuate slot of a vehicle seat frame to function as a guide and a stop.

The armrest assembly 130 includes a cupholder assembly, indicated generally at 140. The cupholder assembly 140 includes a housing 142 attached to the front ends of the side frame members 132. A pair of extension guides 144 is slidably mounted on the side frame members 132. The extension guides 144 are attached to a tray 146 for providing a retractable mounting of the tray 146 relative to the housing 142. The tray 146 is movable between a use position, as shown in FIG. 3, and a stowed or storage position, as shown in FIG. 4. The tray 146 may include one or more floor panels 148 which are pivotally connected to the tray 146 by link arms 150. As shown in FIG. 4, the floor panels 148 are movably to a storage position adjacent the tray 146 when the tray 146 is retracted to reduce the packaging space required to house the cupholder assembly 140. The tray 146 may include any features, such as openings and side supporting walls, for functioning as a beverage or item holder.

Figure 5:
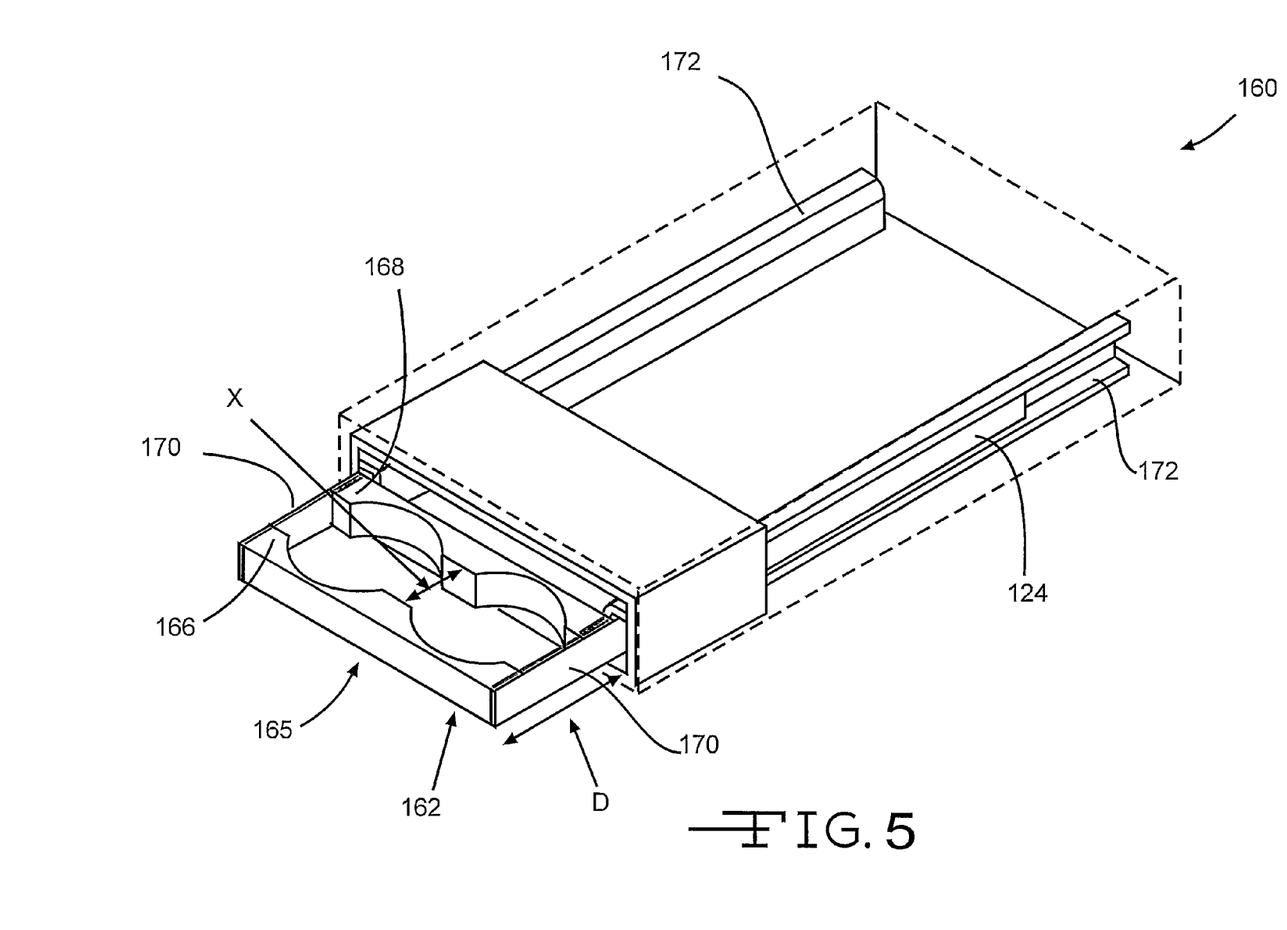
FIG. 5 is a schematic perspective view of a third embodiment of an armrest assembly, wherein the cupholder assembly is shown in its extended use position.

There is schematically illustrated in FIG. 5 a third embodiment of an armrest assembly, indicated generally at 160. The armrest assembly 160 is similar to the armrest assemblies 110 and 130 discussed above and may include any of the features as shown and described with respect to the armrest assemblies 110 and 130. One of the differences is that the armrest assembly 160 includes a cupholder assembly, indicated generally at 162, which includes telescoping features to further reduce packaging space within the armrest assembly 160. A beverage tray, indicated generally at 165, is defined by a front portion 166 and a rear portion 168. The portions 166 and 168 can includes features, such as openings, curved/arcuate portions, slots, floors, and side walls to retain or support a beverage or item. The front portion 166 is attached to a pair of extension guides 170 slidably mounted on side frame members 172. The rear portion 168 is slidably mounted relative to the extension guides 170 such that it can slide relative to the front portion 166 by a distance X. The rear portion 168 can be slid to a use position, as shown in FIG. 5, spaced from the front portion 166 for providing a space or cavity for retaining a beverage or item placed therein. The rear portion 168 may also be movable to a position adjacent the front portion 166 to reduce the overall depth of the tray 165 when retracted in a storage position. In the retracted or storage position, the tray 165 is moved a distance D so that the front face of the tray 165 is generally flush with the front face of the armrest assembly 160. This telescoping feature reduces the depth required to move the tray 165 in a storage position, thereby maximizing a storage compartment space which may be utilized in the armrest assembly 160.

The cupholder assemblies 110, 130, and 160 may include springs and/or dampers for biasing and retarding movement of their respective beverage trays (or tray portions 166 and 168) between their use and/or storage positions. The cupholder assemblies 110, 130, and 160 may also include any suitable latch and deployment mechanisms to move the trays between their use and storage positions. For example, they can include a push-push mechanism that is operated by pushing against the front face of the trays to cause unlatching of a latch so that the retracted trays extend outwardly. The trays then can be pushed in their housings until the latch secures the tray in their storage position. This push-push latch mechanism may function in a similar manner as utilized in a ball point pen.

There is illustrated in FIGS. 6 through 9 a fourth embodiment of an armrest assembly, indicated generally at 180. Note that armrest assembly 180 is shown without foam padding and upholstery cover material thereon. The armrest assembly 180 is similar to the armrest assemblies illustrated in the previous figures and may be incorporated into a vehicle seat such as the armrest assembly 106.

The armrest assembly 180 includes a cupholder assembly, indicated generally at 182. The armrest assembly 180 also includes a body 184 attached to a housing 186 of the cupholder assembly 182. The body 184 defines a storage compartment 186 formed therein. A cover or door (not shown) may be used to cover and provide access to the storage compartment 186. The body 184 and the housing 186 may be integrally formed together or can be separate components. The armrest assembly 180 includes a pair of side members 188 attached to the housing 186 and/or to the body 184. One or more optional cross beams or pivot bars (not shown) may connect the rear ends of the side members 188.

Figure 6:
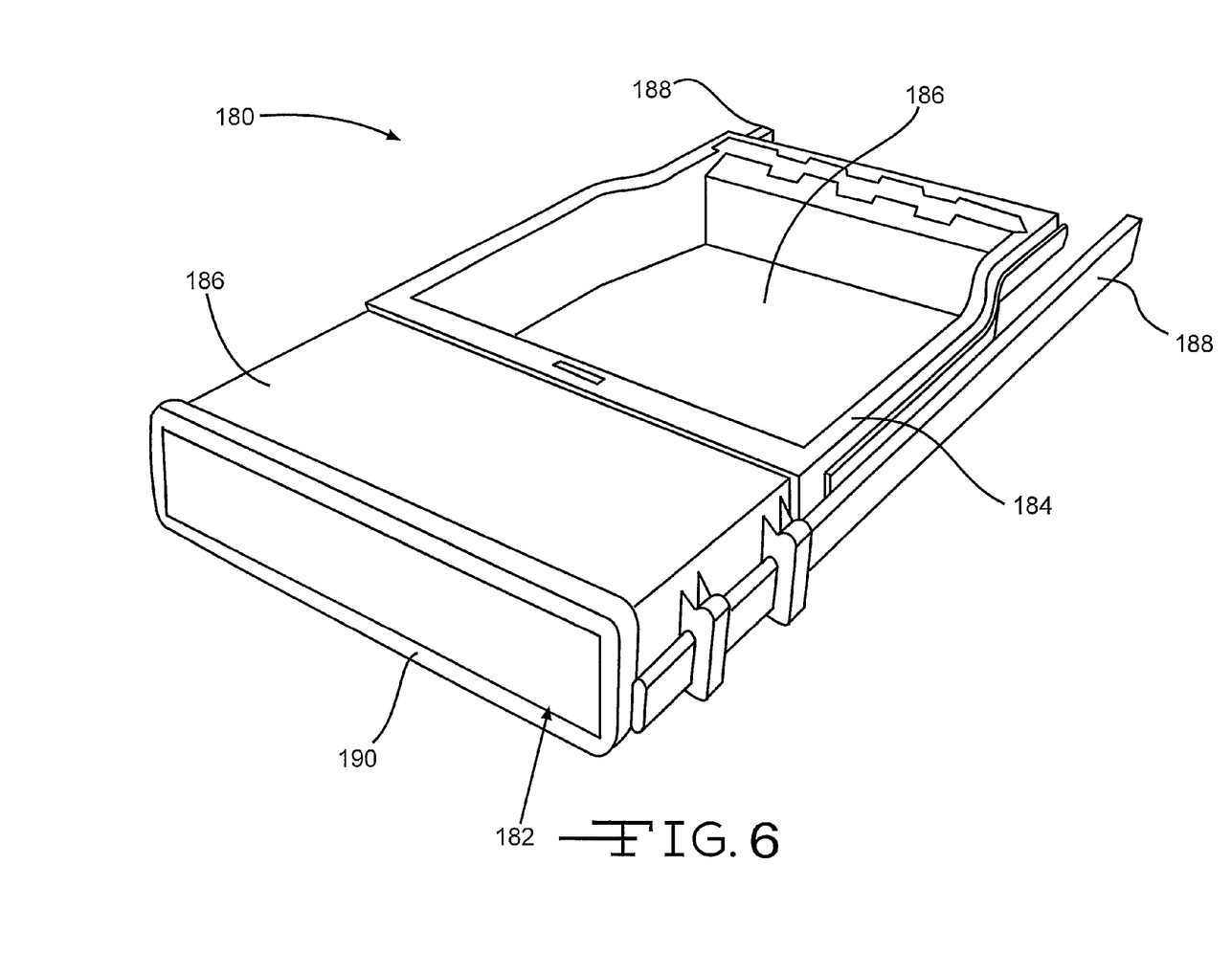
FIG. 6 is a perspective view of a fourth embodiment of an armrest assembly, wherein the cupholder assembly is shown in its retracted storage position.
Figure 7:
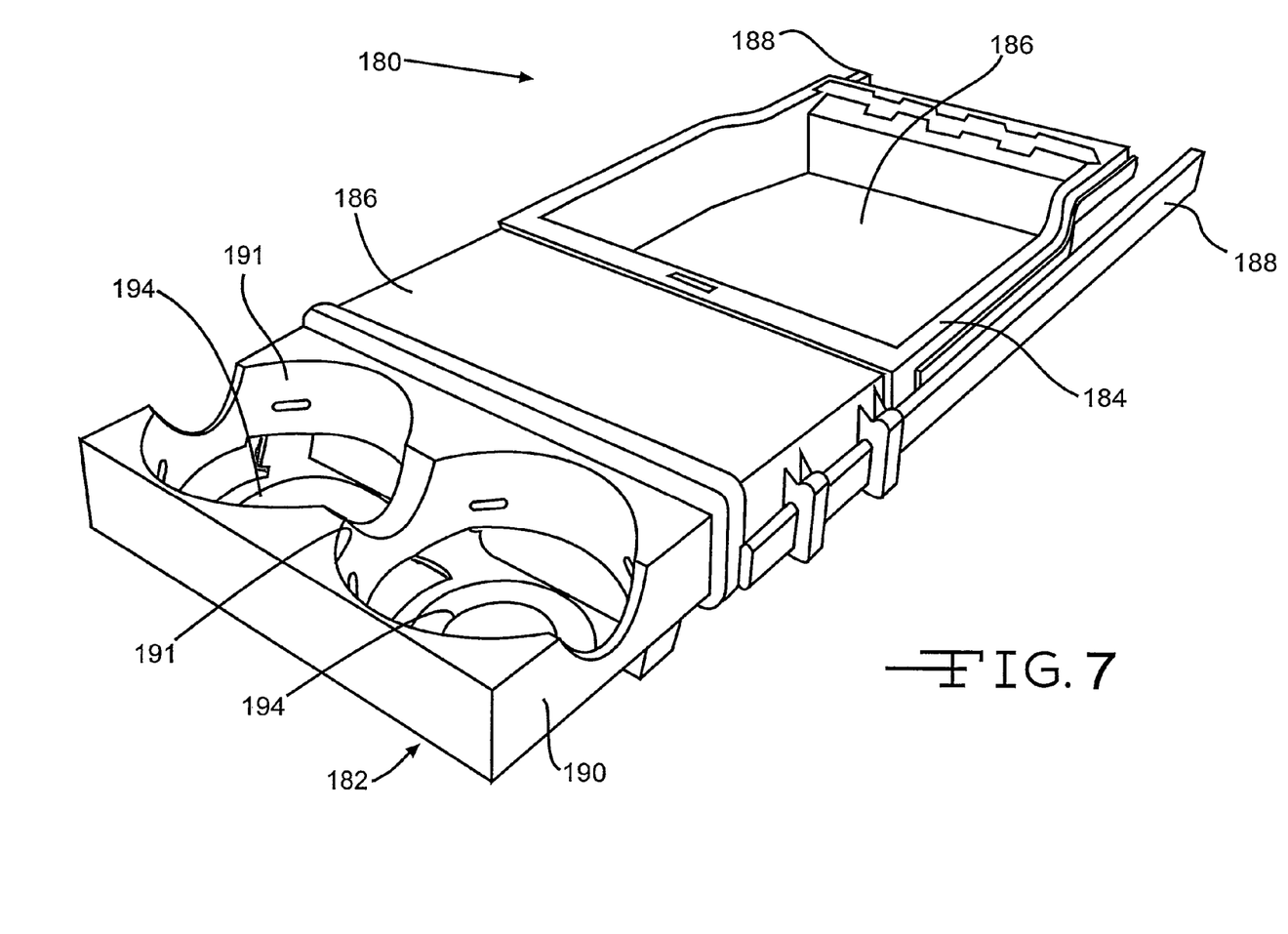
FIG. 7 is a perspective view of the armrest assembly of FIG. 6, wherein the cupholder assembly is shown in its extended use position.
Figure 8:
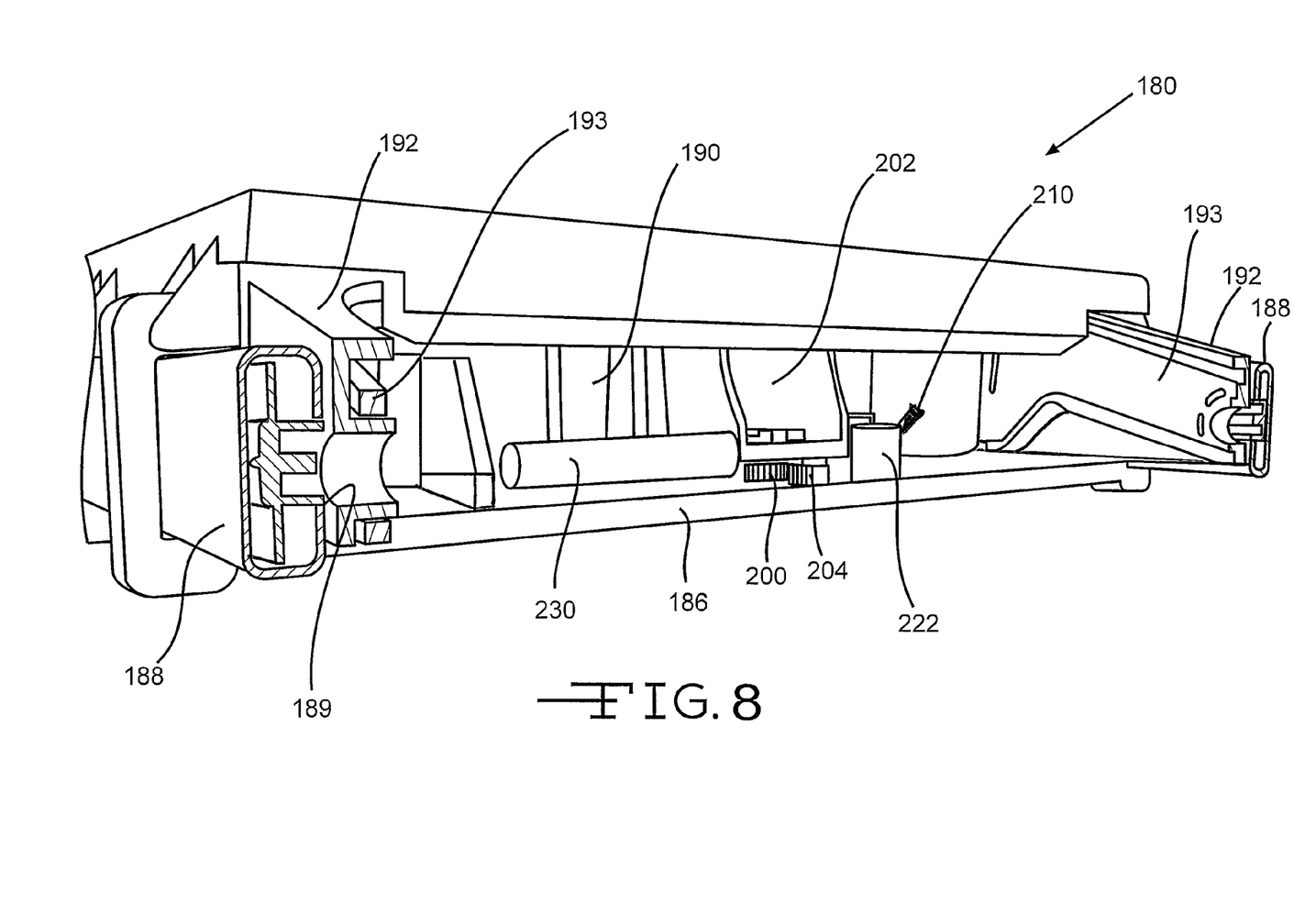
FIG. 8 is a rear perspective view of a portion of the armrest assembly of FIG. 6, shown partially in section, illustrating the cupholder assembly in its retracted latched position.
Figure 9:
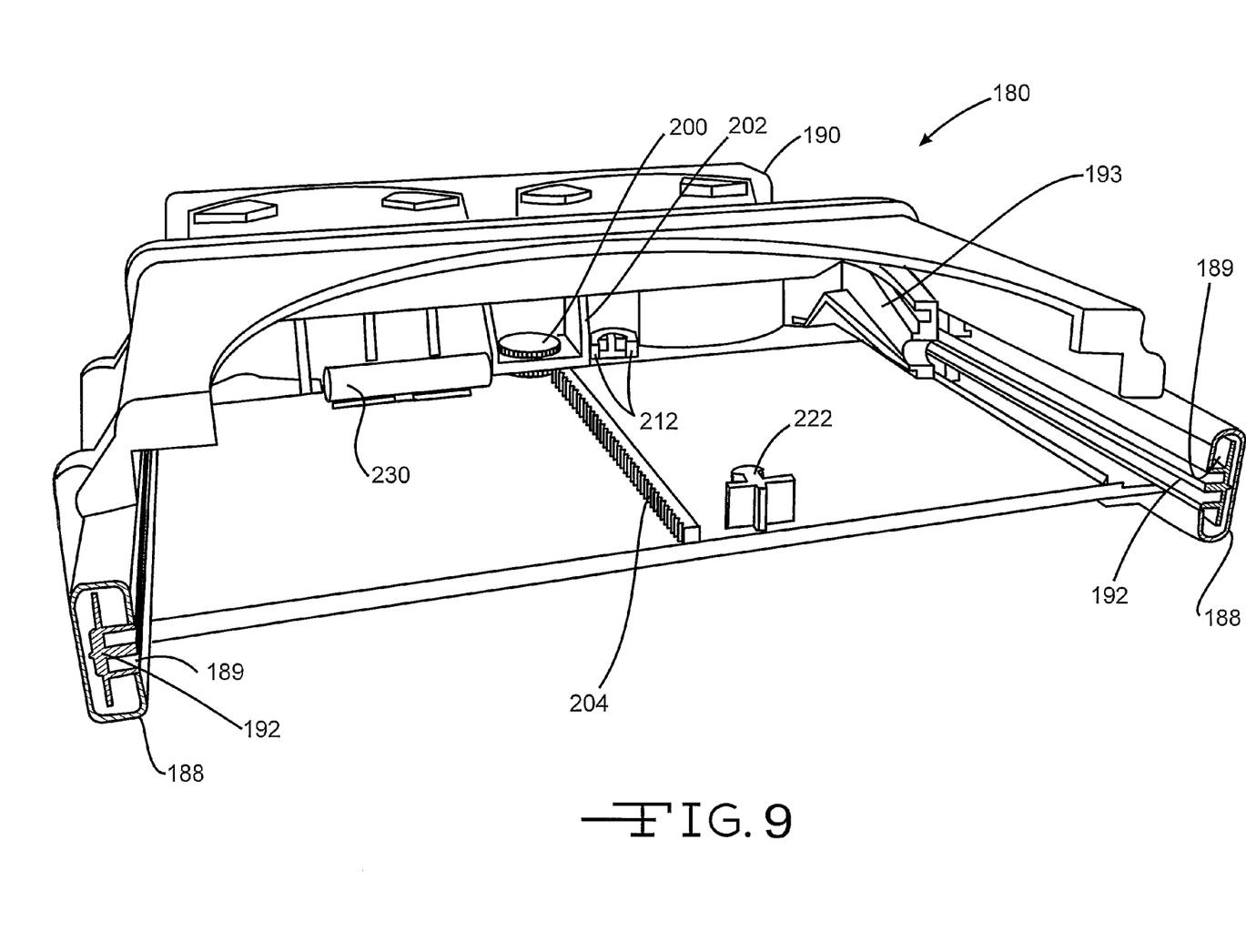
FIG. 9 is a rear perspective view of a portion of the armrest assembly of FIG. 6, shown partially in section, illustrating the cupholder assembly in its extended use position.

The cupholder assembly 182 includes a beverage holder or tray 190 which is movably mounted to the housing 186. The tray 190 is movable between a retracted or storage position, as shown in FIGS. 6 and 8, and a deployed or use position, as shown in FIGS. 7 and 9. The tray 190 may be formed with one or more recesses 191 having side walls that define a cupholder or beverage holder for placing and securing items therein. The tray 190 can be connected to a pair of outer extension guides 192 slidably mounted on respective side members 188. As best shown in FIGS. 8 and 9, the side members 188 can have a generally C-shaped cross section defining an inwardly facing slot 189. The side members 188 may be made of metal and formed by any suitable manner. The extension guides 192 may have elongated portions disposed within the C-shaped side members 188 (and extending through the slot 189) to provide for a sliding mounting relationship therebetween. This mounting arrangement also provides for a reduced packaging space such that the sliding mounting configuration is disposed in the hollow interior of the side members 188. This arrangement also provides for a relatively large width for the storage compartment 186 of the body 184.

The tray 190 may include one or more movable floor panels 194 that are pivotally connected to the tray 190 via link arms 193 extending from the floor panels 194. The link arms 193 may be pivotally mounted on the extension guides 192. Similar to the cupholder 140, the floor panel(s) 194 provides for a lowered bottom floor for supporting a beverage or item when the tray 190 is in its use position, but are able to be retracted upwards into openings of the tray 190 to reduce packaging space when the tray 190 is retracted into its storage position.

The cupholder assembly 182 may include a damper assembly 200 for damping the movement during movement of the tray 190. For example, the cupholder assembly 182 may include a gear wheeled viscous rotary damper 200 mounted on a rear portion 202 of the tray 190. The gear wheel of the damper 200 can ride along a gear track 204 of the housing 186 extending along the longitudinal direction in the interior of the housing 186.

The cupholder assembly 182 may also include a latch mechanism 210, such as a push-push latch mechanism, for securing the cupholder assembly 182 when in its storage retracted position. The latch mechanism 210 may include a pair of movable grasping arms 212 mounted on the rear portion 202 of the tray 190 that engage with a catch 222 mounted on a rear portion of the housing 186.

The cupholder assembly 182 may also include a spring mechanism for biasing the tray 190 in either or both of the storage and use positions. For example, the cupholder assembly 182 may include a roll spring 230 which has a first end connected to the front edge of the housing 186. The roll spring 230 is unrolled when the cupholder assembly 182 is moved to its retracted position as shown in FIG. 8. The rolls of the spring act against the rear edge of the housing 186 to bias the housing 186.

Figure 10:
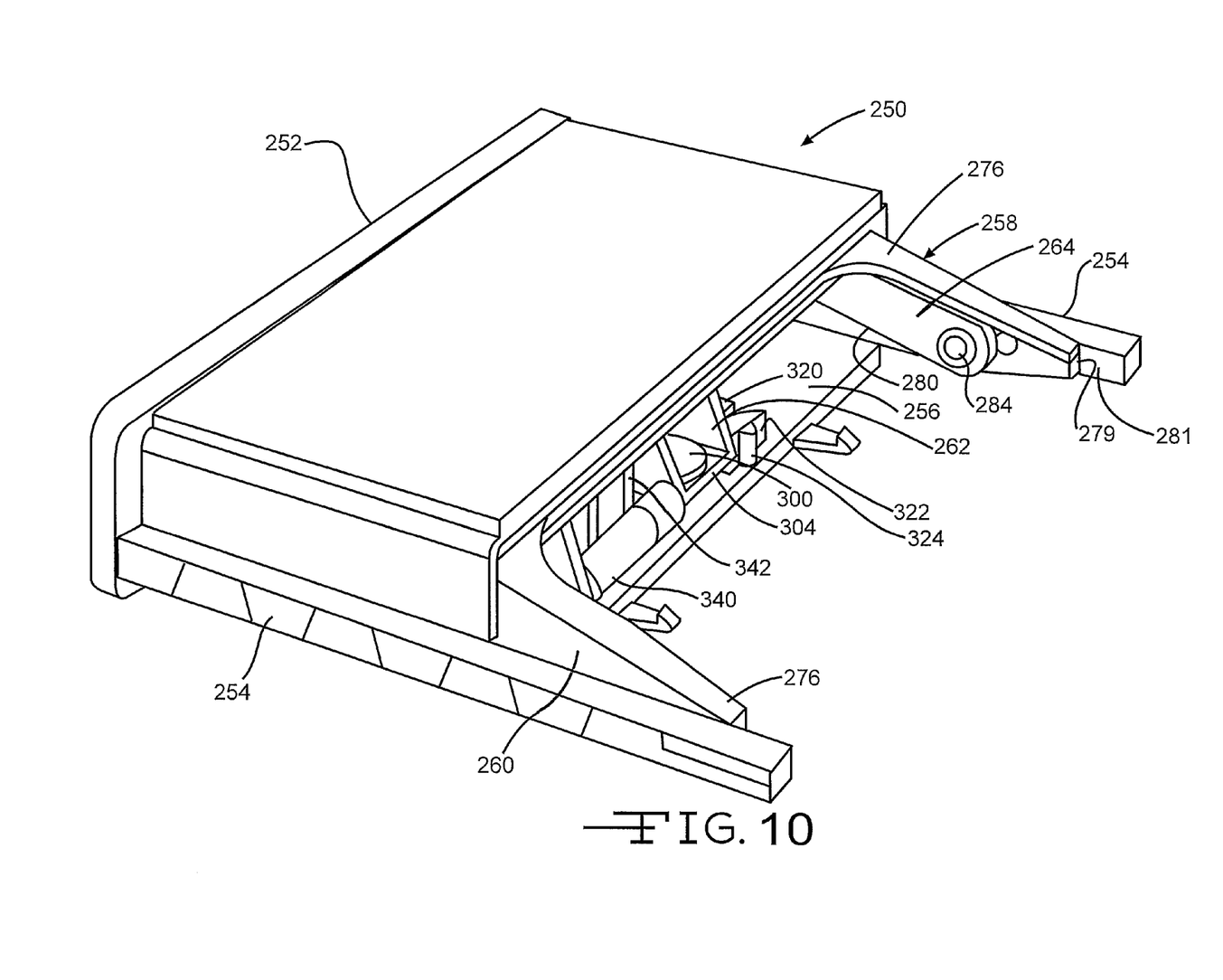
FIG. 10 is a rear perspective view of a fifth embodiment of a cupholder assembly shown in its retracted latched position.
Figure 11:
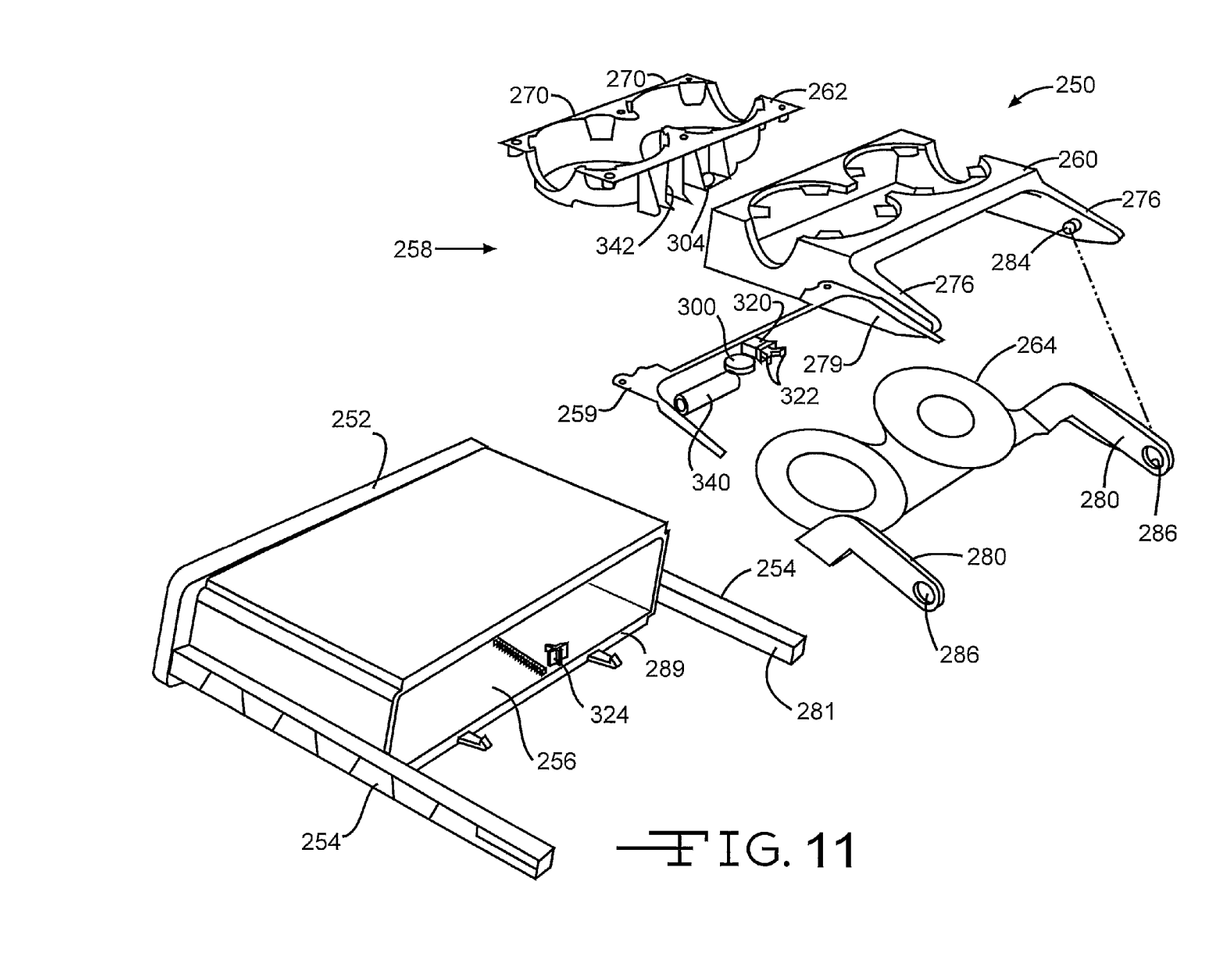
FIG. 11 is an exploded perspective view of the cupholder assembly of FIG.

There is illustrated in FIGS. 10 and 11 a fifth embodiment of a cupholder assembly, indicated generally at 250. The cupholder assembly 250 is similar in structure and function as the cupholder assembly 182 of FIGS. 6 through 9 and may be used with the armrest assembly 180.

The cupholder assembly 250 includes a main body or housing 252 which may be fastened or otherwise fixed to the side members 188 if used within the armrest assembly 180. For example, the housing 252 can include side flanges 254 which may be received within the inwardly facing slots 189 of the C-shaped side members. The housing 252 includes a relatively large cavity 256 for receiving a movable cupholder sub-assembly, indicated generally at 258, which includes a tray 260, a body 262, and a floor panel 264. The cavity 256 defines front and rear openings (rear opening visible in FIGS. 9 and 10). The sub-assembly 258 extends through the front opening when the cupholder sub-assembly 258 is moved between its retracted storage position, as shown in FIG. 10, and its extended use position is a similar manner as the cupholder assemblies described above. In assembly, the body 262 is positioned underneath the tray 260 and is fixedly secured thereto. If desired, the body 262 and the tray 260 may be formed from a single integral part. The sub-assembly 258 may also include one or more reinforcement parts, such as reinforcement part 259 attached to the tray 260. The body 262 includes annular side walls 270 to define cupholder compartments for securing a beverage or other item placed therein.

The tray 260 includes a pair of outer flanges 276 having tracks 279 which are received in inwardly facing grooves 281 formed in the side flanges 254 of the housing 252 to permit translational movement of the sub-assembly 258 relative to the housing 252.

Similar to the cupholders described above, the floor panel 264 provides for a lowered bottom floor for supporting a beverage or item when the tray 260 is in its use position, but are able to be retracted upwards into the cavity 256 of the tray 260 to reduce packaging space when the tray 260 is retracted into its storage position. The floor panel 264 includes a pair of arms 280 which are pivotally connected to the outer flanges 276 of the tray 260. The floor panel 264 can be pivotally attached to the tray 260 by any suitable manner. For example, in the illustrated embodiment, the outer flanges 276 of the tray 260 each include an inwardly extending rim 284 which is received within recesses 286 formed in the arms 280 of the floor panel 264. The mating rims 284 and recesses 286 may be formed with structures functioning as a stop to prevent the floor panel 264 from lowering beyond a predetermined position when deployed. It is also contemplated that the resting of the lower portions of the arms 280 against a bottom floor 289 of the housing 252 may function as a stop.

The cupholder assembly 250 may include a damper assembly for damping the movement of the sub-assembly 258 during movement thereof. For example, the cupholder assembly 182 may include a gear wheeled viscous rotary damper 300 mounted on a mounting flange 304 formed in the body 262. The gear wheel of the damper 200 can ride along a gear track 308 formed in the bottom floor 289 of the housing 252. Rotation of the gear wheel is hampered by the viscous fluid, thereby providing dampened travel.

The cupholder assembly 250 may also include a latch mechanism 320, such as a push-push latch mechanism, for securing the sub-assembly 258 when in its storage retracted position, as shown in FIG. 10. The latch mechanism 320 may include a pair of movable grasping arms 322 mounted on a rear portion of the body 262 that engage with a catch 324 formed at a rear portion of the bottom floor 289 of the housing 252.

The cupholder assembly 250 may also include a spring mechanism for biasing the sub-assembly 258 in either or both of the storage and use positions. For example, the cupholder assembly 250 may include a roll spring 340. The roll spring 340 is essentially a coiled sheet that is biased to remain in a generally coiled position. A free end of the roll spring 340 is attached to a front edge portion of the bottom floor 289 of the housing 252. The coiled portion of the roll spring 340 abuts a curved mounting portion 342 formed in the rear portion of the body 262 and is secured thereto by the bias of the roll spring 340. The roll spring 340 is unrolled when the sub-assembly 258 is moved to its retracted position as shown in FIG. 10. The coiled portion of the roll spring 340 acts against the mounting portion 342 to bias the sub-assembly 258 to its extended position. The latch mechanism 320 prevents the sub-assembly 258 from movement until it is released. Upon release of the latch mechanism 320, the sub-assemble 258 will move to its extended position in a damped motion due to the damper assembly 300. During movement to the extended position, the floor panel 264 will move to its predetermined lowered position.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An armrest assembly comprising:
   a body including two planar sidewalls, each of the planar sidewalls having an inner surface, an outer surface, and a pair of side frame members having outwardly facing sides secured to the outer surface, wherein the outwardly facing sides of the side frame members have respective structures provided thereon; and
   a cupholder assembly including a tray having a pair of side members extending therefrom, the side members being slidably supported on the respective structures provided on the outwardly facing sides of the body.

2. The assembly of claim 1, wherein said body includes a recess, and wherein said tray is movable between retracted position within said recess and an extended position such that said tray extends outwardly from and edge of said body.

3. The assembly of claim 2 further including a spring biasing said tray to one of said extended and retracted positions.

4. The assembly of claim 2 further including a damper mechanism.

5. The assembly of claim 2 further including a latch mechanism for retaining said tray in said retracted position.

6. The assembly of claim 1, wherein said tray is slidably mounted on said side members.

7. The assembly of claim 1 further comprising a housing extending between said side arm members and fixedly connected thereto, and wherein said tray is slidably mounted on said housing.

8. The assembly of claim 1, wherein said side members have slots for receiving a portion of said tray.

9. The assembly of claim 8, wherein said side members are formed from an elongated member having a generally C-shaped cross-section.

10. The assembly of claim 1, wherein said side members provide for structural rigidity of said body of said armrest assembly.

11. The assembly of claim 1, wherein said cupholder assembly includes a bottom floor that is movably mounted on said tray for supporting an item placed thereon.

12. The assembly of claim 1, wherein said armrest is pivotally mounted in a recess of a seat back.

13. The assembly of claim 1 further including a cross bar extending between said side members.

14. The assembly of claim 13, wherein said tray, side members, and cross bar are positioned at outer peripheral locations of said body of said armrest.

15. The assembly of claim 14, wherein said body defines a storage compartment between said side members.

16. The assembly of claim 1, wherein said tray includes first and second portions movable relative to one another.

17. The assembly of claim 1, wherein said body includes foam padding and a cover material.

* * * * *